(No Model.)
2 Sheets—Sheet 1.
G. D. BURTON.
ELECTRIC FORGE.
No. 496,593. Patented May 2, 1893.
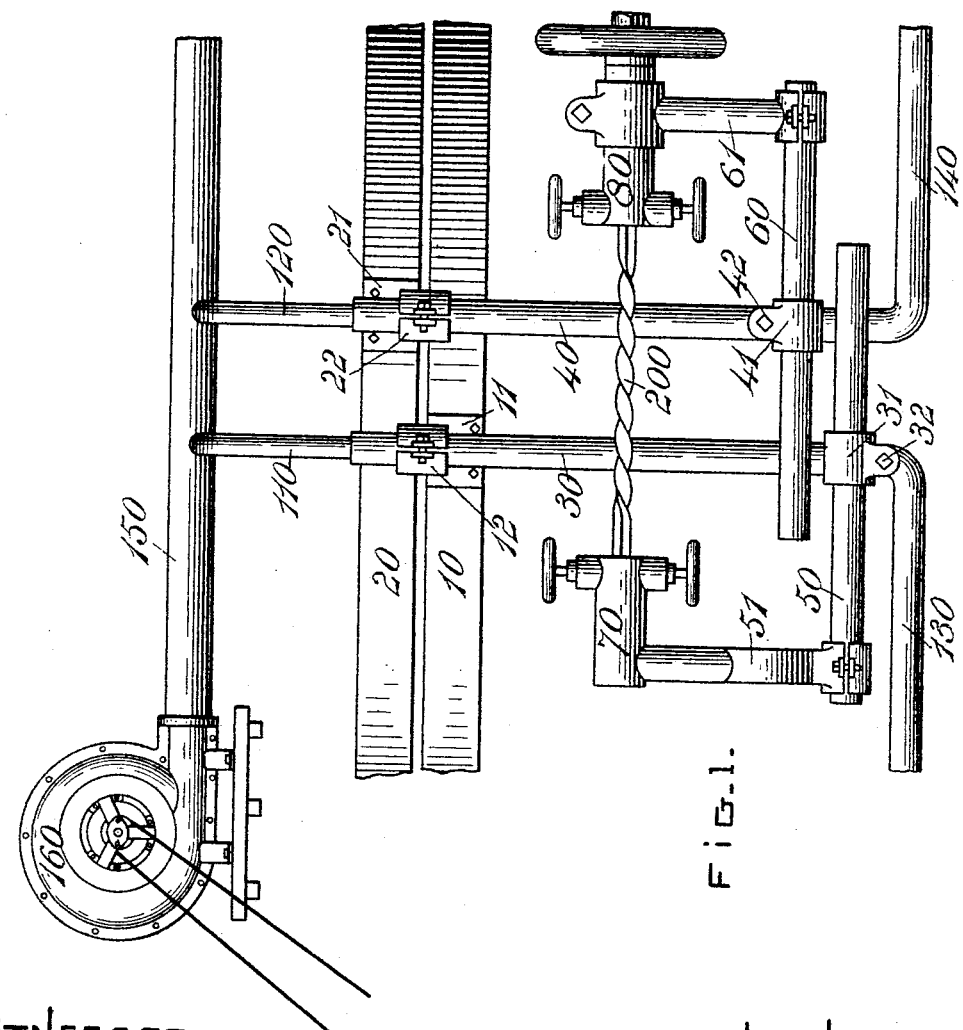
Witnesses—
Inventor—
Geo. D. Burton
By F. C. Somes,
Attorney.

(No Model.) 2 Sheets—Sheet 2.
G. D. BURTON.
ELECTRIC FORGE.
No. 496,593. Patented May 2, 1893.
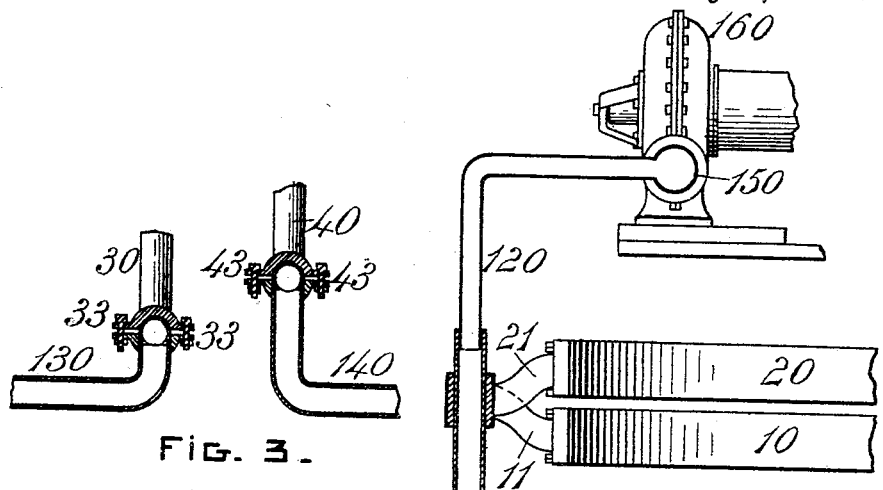
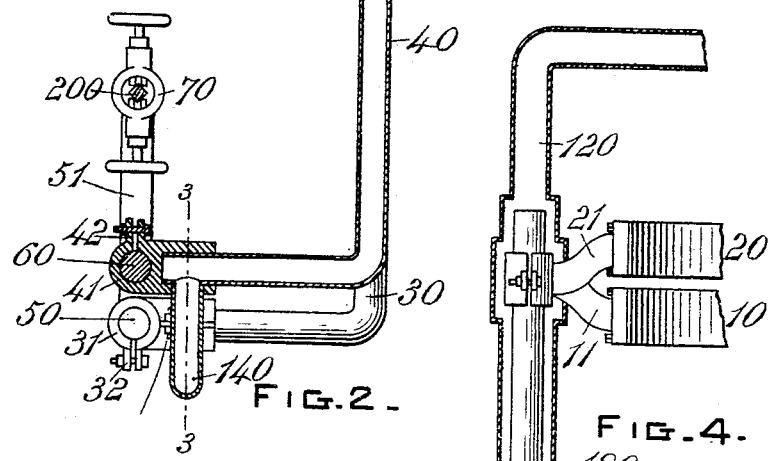
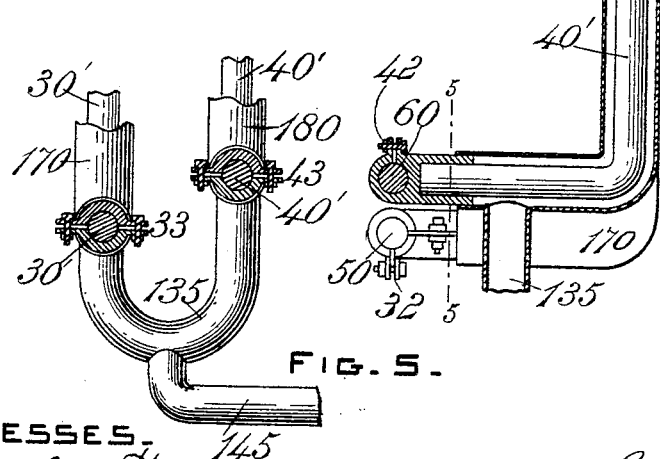

UNITED STATES PATENT OFFICE.

GEORGE D. BURTON, OF BOSTON, MASSACHUSETTS, ASSIGNOR TO THE ELECTRICAL FORGING COMPANY, OF MAINE.

ELECTRIC FORGE.

SPECIFICATION forming part of Letters Patent No. 496,593, dated May 2, 1893.

Application filed April 15, 1892. Serial No. 429,320. (No model.)

*To all whom it may concern:*

Be it known that I, GEORGE D. BURTON, a citizen of the United States of America, residing at Boston, in the county of Suffolk and State of Massachusetts, have invented certain new and useful Improvements in Electric Forges, of which the following is a specification.

This invention relates to an electric forge for heating metal preparatory to working, forging, shaping or tempering it.

The objects of this invention are to avoid heating of the conductors leading to the clamps which grasp the metal to be heated and to utilize the heat developed in said conductors.

Figure 1 of the accompanying drawings represents a front elevation of this improved electric forge having tubular conductors in connection with an electric current converter. Fig. 2 represents a side view thereof partly in section and partly in elevation. Fig. 3 represents a vertical section on line 3—3 of Fig. 2. Fig. 4 represents a vertical section of this improved electric forge having solid conductors and cooling pipes surrounding said conductors. Fig. 5 represents a vertical section on line 5—5 of Fig. 4.

The same reference numbers are used in all the figures to designate the same parts.

This improved electric forge is connected with an electric current converter or other source of a heating current. The ring 10, whereof a segment only is shown in the drawings, represents one pole of the electric converter, and the ring 20, whereof a segment only is shown, represents the other pole of said converter. A conductive bracket 11 provided with a clamp 12 is attached to the ring 10 and a conductive bracket 21 provided with a clamp 22 is attached to the ring 20.

In the construction shown in Figs. 1, 2 and 3, a tubular conductor 30 composed of copper or other suitable conductive material is connected with the bracket 11, and a tubular conductor 40 also composed of copper or other suitable material is connected with the bracket 21. Caps 31 and 41 also composed of conductive material are disposed on and serve to close the outer ends of the tubular conductors. These caps are provided respectively with clamps 33 and 43 whereby they are attached to said conductors and with clamps 32 and 42. Conductors 50 and 60, which are shown as solid, are supported in the clamps 32 and 42, and standards 51 and 61 composed of conductive material are connected with and preferably adjustable on the solid conductors 50 and 60. Clamps 70 and 80 for grasping the bar to be heated are supported at the upper ends of these standards. As shown in the drawings, these clamps are tubular, but any suitable form of clamps or metal holders may be used as an equivalent of the tubular clamps. The clamp 80 is shown as journaled in the upper end of the standard 60 so as to be rotated for twisting the bar while it is hot. An electric heating current of large volume and small voltage passes from the ring 10 through the conductive bracket 11, through the conductor 30 and cap 31, through the solid conductor 50, through the standard 51, through the clamp 70 and into and through the bar, as 200, spanning the space between the clamps 70 and 80. The current passes out from the bar 200 into and through the clamp 80, through the standard 61, through the solid conductor 60, through the cap 41, through the conductor 40 and through the bracket 21 to the opposite pole of the converter. In passing through the bar, the current encounters resistance and heat is developed sufficiently to quickly raise the bar to a forging temperature. The heating current will pass in the opposite direction in case the ring 20 be the positive and the ring 10 the negative pole of the converter. Unless the conductors are massive in construction the current has a tendency to heat them.

To avoid the heating of the conductors fluid pipes 110 and 120 are connected to the upper ends of the tubular conductors 30 and 40 respectively whereby a cooling fluid, such as air or water, may be passed in contact with said conductors. Exhaust pipes 130 and 140 are connected to the lower ends of said tubular conductors and serve to convey away the cooling fluid which having become heated by contact with the conductors may be utilized for heating purposes. The pipes 110 and 120 are represented as connected with a pipe 150 and a blower or pump 160 is connected with said pipe 150, said blower or pump serving as a convenient means for forcing the cooling fluid through or into contact with the conductors. This pipe 150 may be considered as an air-flue deriving air from any source of air currents or as a hydrant pipe for supplying water.

In the construction shown in Figs. 4 and 5, the conductors 30' and 40' which correspond to the conductors 30 and 40 of the other figures, are represented as solid and cooling pipes 170 and 180 surround said conductors and pass the cooling fluid in contact therewith. In this case the caps 31 and 41 shut over the lower ends of the solid conductors and the surrounding tubes fit over the inner ends of said caps. These surrounding tubes are provided with a U-shaped exhaust pipe 135 to which a single exhaust pipe 145 is connected.

In the use of this apparatus, a bar, as 200, to be heated is placed in the clamps 70 and 80 and the current is permitted to pass through that portion of said bar which spans the space between said clamps. During the heating operation a current of water or of air or other cooling fluid is conveyed through the pipe 150 and through the branch pipes 110 and 120 into and through the conductors 30 and 40 or through the pipes 170 and 180 and around the conductors 30' and 40'. A current of the cooling fluid is induced by means of the pump or blower 160, or by gravity or other means of forcing or drawing fluids. The fluid in passing in contact with the conductors absorbs the greater portion of the heat developed therein. This absorption of the heat by the passing fluid avoids overheating of the conductors and enables the absorbed heat to be utilized for heating purposes at any desired point. If the heated fluid is not desired for use it may be allowed to escape at the outside of the building.

I claim as my invention—

1. In an electric forge, the combination of conductors for conveying a heating electric current, and pipes or jackets surrounding said conductors for conveying a cooling fluid thereto.

2. In an electric forge, the combination of conductors for conveying a heating electric current, pipes surrounding said conductors for conveying a cooling fluid thereto, and a fluid forcing apparatus connected with said pipes.

3. The combination of an electric converter, an electric forge, conductors connecting the secondaries of said converter with said forge, and a pipe for conveying a cooling fluid, said conductors passing through said cooling pipe.

GEO. D. BURTON.

Witnesses:
CHAS. F. ADAMS,
CHESTER MARR.